United States Patent [19]

Sleeter et al.

[11] Patent Number: 5,607,633
[45] Date of Patent: Mar. 4, 1997

[54] CO-ADHESIVE SYSTEM FOR BONDING WOOD, FIBERS, OR AGRICULTURE BASED COMPOSITE MATERIALS

[75] Inventors: Ronald T. Sleeter, Decatur, Ill.; Kenneth D. Roos, St. Peter, Minn.

[73] Assignee: Archer Daniels Midland Company, Decatur, Ill.

[21] Appl. No.: 502,167

[22] Filed: Jul. 13, 1995

[51] Int. Cl.$^6$ ................................................ B29C 67/00
[52] U.S. Cl. .......................................... 264/115; 264/109
[58] Field of Search ................................. 264/115, 109

[56] References Cited

U.S. PATENT DOCUMENTS

| | | | |
|---|---|---|---|
| 4,505,869 | 3/1985 | Nishibori | 264/115 |
| 5,055,247 | 10/1991 | Ueda et al. | 264/109 |
| 5,093,058 | 3/1992 | Harmon et al. | 264/115 |
| 5,209,886 | 5/1993 | Simons | 264/109 |
| 5,480,602 | 1/1996 | Nagaich | 264/122 |

*Primary Examiner*—Mary Lynn Theisen
*Attorney, Agent, or Firm*—Laff, Whitesel, Conte & Saret, Ltd.

[57] ABSTRACT

The invention provides an adhesive system comprising a blend of resin and a co-adhesive conjugated triglyceride, which is especially well suited to bonding composite panels such as oriented strand board, particle board, plywood, MDF, hardboard, and similar panels. The resin is a fast acting bonding material which forms a mat of fibers into a self sustaining panel within a time limit during which a press may be economically utilized. The triglyceride acts slower so that, after the panel is formed, there is enough time to penetrate the fibers to a depth that results in a superior bonding.

20 Claims, No Drawings

CO-ADHESIVE SYSTEM FOR BONDING WOOD, FIBERS, OR AGRICULTURE BASED COMPOSITE MATERIALS

This invention relates to an adhesive system especially— but not exclusively—for bonding various wood, wood chip, fiber, and agriculture based composite based materials and more particularly—but again not exclusively—to means for and methods of making a new and improved particle board, plywood, oriented strand board, medium density fiberboard, hardboard, structural strand lumber, or the like.

Reference is made to a companion patent application Ser. No. 08/472,919, filed Jun. 7, 1995, which describes the co-adhesive system, per se, which is used as described herein. This co-adhesive system could be used in conjunction with PF, UF, melamine, aromatic isocyanate resins, or a combination of these resins. The inventive system enables a production mill to reduce overall resin cost, reduce overall mill VOC emissions, and diminish maintenance on operations equipment. The co-adhesive can also be blended with a natural wax to act as a wax/sizing agent in order to replace the petroleum waxes used heretofore, i.e., slack wax and or petroleum based emulsion waxes used in the manufacturing processes.

"Drying oils" are triglycerides which have the ability to dry or polymerize. Text material on drying oils is found in *Bailey's Fats and Oils*, Ch. 10. Some examples of drying oils are: linseed, fish, soybean, tall, tung, castor and oiticica. Drying oils are composed of fatty acids which have a preponderance of two or three double bonds. The drying ability of these oils is related to their Iodine Value ("IV"), which is a quantitative measure of the number of double bonds that they contain. Oils in the range of 195–170 IV are relatively fast-drying. Oils in the range of 140–120 IV are semi-drying, and oils with IV's under 120 are non-drying.

"Drying oils" include conjugated oils. The term "conjugation" is used herein to describe triglycerides which have double bonds on adjacent carbon atoms.

For natural oils containing more than one carbon to carbon double bond, the double bonds are generally separated by a methylene group, commonly referred to as being "methylene interrupted". These fats and oils have nutritional benefits; however, the methylene interruption limits their use in industrial polymerization applications, where they could find use as coatings, adhesives and the like. For these fats and oils to be so used industrially, they need to polymerize rapidly. For this to occur, it is advantageous to have the double bonds adjacent to one another or "conjugated" (i.e., the methylene interrupt is shifted or relocated).

A simple explanation of this methylene interrupt shift is illustrated by the following example showing only carbon atoms:

The carbon chain on the left is methylene interrupted between the two carbon atoms having double bonds. The carbon chain on the right is conjugated by shifting the methylene group to the end of the chain of carbon atoms.

For these vegetable oils to be useful industrially, they need to be made to polymerize rapidly. This can be accomplished by conjugating the double bonds to produce rapidly polymerizing oils. Over the years, many methods have been developed to produce conjugated oils by shifting the methylene interruption between the double bonds. Unfortunately, only limited commercial amounts of such modified vegetable oils have been produced using these methods due to their expense and other limitations.

Plant life gives off volatile organic compounds ("VOC") which are atmospheric pollutants. In the wild, VOC's tend to be unimportant and it would be very rare, if at all, that natural VOC's would create a problem. However, in the manufacture of certain products based on plant life, there can be a concentration of VOC's which become a serious pollutant. Therefore, in any product such as this invention a limitation upon the output of the VOC's becomes very important. Federal, state and local regulations severely limit the release of VOC's; see, for example, the EPA Clean Air Act.

Wood is one of the world's most significant renewable resources. However, since the world's supply of large diameter trees for producing lumber and plywood products is decreasing, modern technology is trying to extend the dwindling forest resources. As a result, smaller diameter trees and more species types are being used. Hence, the production of plywood and other wood composites, including particle board, using adhesives as binder, has increased substantially during the last 50 years.

By way of comparison, plywood manufacturing recovers only about 60–70% of the tree stem. Particle board and "oriented strand board" or simply "OSB", can satisfactorily utilize, perhaps, in the order of 90% of the same tree stem. The particle boards are wooden strand panels bonded with resol resins, urea formaldehyde or isocyanate, and polymeric methylene diphenyl diisocyanates. The remainder of the specification will focus on oriented strand boards "OSB", by way of example; however, this concentration on OSB is for convenience of this description and does not limit the invention thereto. The invention is applicable to at least plywood, particle board, OSB and all similar boards.

In order to make OSB, bark is first stripped from logs, and then, the debarked logs are cut into suitable lengths and fed into a flaker. There, they are reduced into thin flakes which are fractured to produce narrow, thin strands of wood. These wood strands are dried to reduce their moisture content from roughly 50 percent to about 5 percent of the total mass.

Next, the dried strands are blended with a suitable petroleum based "slack" wax or emulsion and a liquid or dry resin which is a glue that binds the strands together later in the manufacturing process. The petroleum based wax helps repel water in the finished flake board. The strands are then formed into mats with the strands oriented so that the strands of one layer lie crosswise over the strands of the next neighboring layer. The result is a five-layer, for example, mat of cross-oriented strands which is several inches thick. Thereafter, the strand-laden sheets are loaded into a press where heat and pressure are applied simultaneously in order to compress the mat to desired thickness and activate the resin, thereby bonding the strands into particle board panels.

When a composite board, such as a particle or OSB board, is made, the wood fibers and adhesive material are placed in a press which applies a pressure for several minutes. The total time in the press varies with the parameters of the mat and with the resin technologies that are used. The thicker the mat the longer the press time. The adhesive bonds the wood particles together so that they become a completed self-sustaining panel by the time that the press opens.

It is thought that the bonding time has to do with how long it takes for the adhesive to polymerize, especially under the pressure and temperature conditions prevailing in the closed press. However, it is also thought that this need for rapid bonding is the cause of some of the problems with particle board such as edge swelling, delamination, patches tearing away, and the like.

One of the problems with particle boards is that patches of the aggregated fibrous material may be torn from the surface of the board, edges of the panel may delaminate, or swelling may occur, especially if the particle board is mechanically stressed or exposed to hostile environments. In general, this tendency for patches of particle board to tear out or otherwise separate is addressed by this invention.

More particularly, the invention uses a drying oil or catalytic bonding material, especially as a co-adhesive for bonding and securing the aggregation of wood chips, fibers, or other agriculture based composite materials into the composite panel, in combination with a conventional adhesive. One example of such a drying oil or catalytic bonding material is found in European Patent Application No. 0 040 577, dated May 14, 1981, opened to the public Nov. 25, 1981, Georges Cecchi and Eugene Ucciani, inventors. However, it has been found that the ruthenium on carbon, as practiced by Cecchi and Ucciani in the European Patent Application No. 0 040 577, was not capable of reuse as claimed. It is critical for a process of this nature to be capable of numerous reuses due to the expense of the catalyst. Catalyst activity for used catalyst of this patent is reduced by a factor of one-half for every reuse, when used for conjugation of linseed oil. Typical conversions start at 85% conjugation for the first reaction, about 40% conjugation for the second reaction with the catalyst used once, and about 20% conjugation for the third reaction with the catalyst used twice. Therefore, for practical commercial products, the Cecchi-Ucciani procedure leads to a prohibitively high cost to make conjugated oil, primarily due to the loss of catalyst activity. Thus, the use of ruthenium on carbon alone is not a viable process.

Before adopting a new bonding material, at least four major factors should be considered:

1) ease of formulation and application of the bonding material,
2) effect on the physical properties of the board,
3) effect on the environment and human health, and
4) the relative costs of alternative materials.

Linseed oil is the first choice drying oil for use in the invention due to its high levels of unsaturation (IV= 155–205), especially of linolenic acid which generally exceeds 55% by weight. Linseed has well-known agronomic properties and has been grown in the past in large quantities. Soybean oil and safflower oil are two other candidates. However, they are generally considered less desirable because they have less total unsaturation with most of the unsaturated fatty acids in these oils being linoleic (IV= 120–141 and 145 respectively).

Prior methods for the conjugation of double bonds in drying oil yield low conversions requiring long reaction times at high temperatures. This low yield favors subsequent polymerization of the conjugated products being formed thereby additionally lowering the yield. The conjugation of the oil proceeds through an optimum yield of conversion at which point polymerization outpaces conjugation and the amount of conjugated oil actually decreases as the reaction proceeds. This ultimately produces an oil of such high viscosity as to render it useless for many applications.

In general, the cost of the inventive product made with the inventive co-adhesives is significantly less than the cost of the material which it replaces, and thus providing a lower overall cost of manufacturing without sacrificing the quality and strength of the composite panel. Also, the co-adhesives may be upgraded to produce products with specifications which cannot otherwise be produced without resorting to adhesives of much greater expense. As well, the inventive co-adhesives have much reduced VOC's.

Adhesives currently used by manufacturers of various wood composition based panels include urea-, phenol-, melamie-urea and melamine-formaldehyde and polymeric isocyanate ("UF", "PF", "MUF", "MF", and "PMDI"). However, manufacturers of composite panels continue to search for supplements to or replacements for adhesives presently used, especially those which are based on urea- and phenol-formaldehyde adhesives, because of environmental and health concerns. Primarily the effort is to reduce or eliminate the emitted amount of free formaldehyde, especially the emissions resulting from consolidating mats of resin-coated particles under heat and pressure. These efforts are primarily directed to altering resin chemistry or adopting resin components or new adhesives, such as isocyanates that do not emit formaldehyde.

Isocyanates are one of the adhesives which are currently used as an alternative to the environmentally unfriendly adhesives. However, isocyanates present disadvantages that must be also considered. Even though somewhat better than prior adhesives, the isocyanates are not entirely free of health risks. The isocyanates can react with moisture on the skin or with moisture in the lungs if inhaled as atomized isocyanate or isocyanate-coated wood dust. Also, isocyanates can cause manufacturing problems since they can bond to metals (i.e., metal plates and presses) and can have a considerably shorter open time on the stands than UF or PF. Isocyanates may be more expensive than other conventional adhesives.

More information on suitable adhesives can be found in articles in the publication "*Adhesives Age*" for May 1981 (pages 41–44) and October 1992 (pages 22–25).

Accordingly, an object of this invention is to provide new and improved adhesive materials having a widespread use, especially—but not exclusively—as adhesives used to manufacture OSB, particle board, plywood, or the like. Here, an object is to provide drying oils or bonding agents which may be used in conjunction with other adhesives in order to make a bonding system superior to either resin or a drying oil taken alone. In particular, an object is to provide composite panels, such as OSB, particle boards, plywood or the like, which have an increased inner bond strength and are less prone to tearing, swelling or delaminating.

Another object of the invention is to provide new uses for agriculture products, especially for residual agriculture materials which may remain after more valuable elements (such as food products) have been removed therefrom.

Accordingly, in keeping with an aspect of the invention, a first co-adhesive system has an amount of conventional adhesive that is used to quickly form the fibrous mat into a bonded board or panel. A second co-adhesive is an amount of conjugated triglyceride or drying oils which is added to penetrate the wood fibers of the bonded board or panel over an extended drying time, thereby enhancing the bonding strength as compared to the strength of the adhesive system using only a resin alone.

The inventive system is based on a conjugated triglyceride, such as a preferred modified linseed oil containing amounts of linolenic acid, which are a portion in the order of 50% or higher of the total linseed oil. Other unsaturated triglycerides containing high amounts of linoleic acid may also be utilized, but are not necessarily preferred, such as: soybean oil, China wood oil or tung oil, tall oil, castor oil, oiticica oil, various fish oils and the like.

It has been discovered that most organo-ruthenium complexes, ruthenium salts and, to a limited degree, ruthenium covalent compounds and ruthenium salts in which ruthenium is in any of its several valence or oxidation states, catalyze the conjugation of methylene interrupted double bonds in common vegetable oils. Most compounds of ruthenium which can be solubilized into the substrate (oils with high Iodine Values composed of methylene interrupted double bonds) are or form active homogeneous catalysts to conjugate double bonds. Indeed, organic compounds in general which have methylene interrupted double bonds can be conjugated with the process of this invention.

It has been found that the successful use of these forms of ruthenium depends upon the presence of an acid during the reaction. The preferred acid is formic acid. Some other acids such as organic acids (e.g., acetic, benzoic, oxalic) or HCl (in gaseous form) and also some low molecular weight alcohols (e.g., methanol, ethanol and isopropyl alcohol) work with ruthenium, but to a much lesser degree.

Also, combinations of these acids, such as formic acid and HCl (gaseous), may be used. In addition, surprisingly low levels of ruthenium of the order of 10–20 ppm can achieve in excess of 80% conversion to conjugation. These catalysts can be used at any level, although the conversion of methylene interrupted double bonds to conjugated double bonds decreases in efficiency as lower and lower levels of catalyst are used based on ruthenium content. Thus, the level of ruthenium as metal should be at least about 5 ppm and not more than about 200 ppm, based on the weight of the oil being treated.

A level of about 10–50 ppm ruthenium is preferred and a level of about 10–20 ppm is most preferred. On the other hand, the level of acid should be not more than about 4 percent by weight, based on the weight of the oil being treated, with the lower end being determined on a case-by-case basis. The preferred level of acid will be about 0.8 to 2.4 percent by weight.

Finally, the reaction should be carried out in the absence of any significant amounts of oxygen. Thus, common vegetable oils such as linseed oil may, in accordance with the invention, be conjugated efficiently and economically to produce modified oils having unique drying properties.

The criteria for the oil substrate is that a significant amount of unsaturated fatty acid triglycerides (such as linolenic, linoleic, eicosapentanoic, etc.) are present which have conjugatable double bonds. This oil is then conjugated by using any of several methods which may be chosen based on an optimization of yield and production costs for the conversion. In general, the production costs result from the catalyst used, oil pretreatment reaction temperature, time and pressure required in the press, and the like. Some examples of the inventive methods of conjugation are described in the above-identified companion application, and are based on a use of one or more of the following catalysts: ruthenium, $SO_2$, amine hydroiodides, primary alcohols, alkali, anthraquinone, nickel/carbon, and others.

Examples of useful ruthenium complexes are dodecacarbonyl triruthenium, dichlorotris(triphenylphosphene) ruthenium (II) and ruthenium (III) 2,4-pentanedionate. An example of a useful ruthenium salt is ruthenium (III) chloride hydrate which is particularly preferred in the practice of this invention. An example of a covalent compound is ruthenium dioxide.

Optimally, it has been found for dodecacarbonyl triruthenium, a 50 ppm ruthenium basis amount of catalyst converted linseed oil to 75% conjugated linolenic acid and 25% conjugated linoleic acid product with a reaction temperature of 180° C. and a reaction time of 1 hour. With the triphenylphosphene, reaction of the methylene interrupted double bonds had somewhat increased selectivity forming a greater proportion of trans isomers prior to proceeding to conjugation. It was intensely active, producing 85.3% conjugation of linolenic acid in three hours with 10 ppm ruthenium basis and 180°. The pentanedionate gave a conjugation of 50.7% at 20 ppm and 180° C.

It has been found in nearly all cases that when most forms of ruthenium are allowed to come into contact with the substrate under the reaction conditions, they will solubilize into the substrate as homogeneous catalysts or be converted into homogeneous catalysts. Solubilization and activation of the ruthenium is achieved optimally with the use of formic acid. The greatest success is achieved by the presentation of ruthenium to the substrate (linseed oil or organic compound) in a monomolecular form. Most organoruthenium complexes are soluble in the substrate allowing the dispersal of ruthenium in molecular form. The ruthenium, so dissolved, can then be further reacted and activated into highly active catalysts by formic acid and other acids and alcohols, as discussed above. The action of the formic acid is not fully understood at this time. It may act to reduce the ruthenium complex into dispersed metallic molecular ruthenium.

It is preferred in the practice of the invention to use ruthenium (III) chloride hydrate. This compound is preferred not only because of cost and availability, but also because no costly conversion to an organo-ruthenium complex is required. As an example, $RuCl_3$-hydrate may be solubilized into linseed oil by prior solubilization into alcohols or organic acids such as methanol, ethanol or formic acid. The resulting $RuCl_3$ solution can then be dispersed and eventually completely dissolved into solution. For example, only 20 ppm of ruthenium as $RuCl_3$-hydrate was found to be needed to produce a conjugation of 85% of linseed oil.

The conjugated triglyceride product may then be blended with a triglyceride such as one which has been hardened by hydrogenation to produce a very hard fat with a high melting point; examples of which would be soy stearin, cotton seed stearin, and palm oil stearin. A high melting point hydrocarbon wax may also be used as a blending agent. One preferred example of a high melting hydrocarbon is a petroleum byproduct known as petroleum based slack wax or emulsion waxes. The hard fat and wax with a high melting point are almost equally effective. The choice of which to use depends largely upon cost and possible detrimental disadvantages such as increased volatility, etc.

The method used to apply the co-adhesive material onto the strands may employ a spinning disc, air atomization, spray, or the like, depending primarily upon the form of the adhesive material, available equipment in the mill, and the end use application. A solid form of the inventive co-adhesive material and wax could be used in the manner that slack waxes are used. An emission or suspension may be used by mills that are currently using a wax emulsion. A straight conjugated triglyceride oil solution could be supplied to mills as a co-adhesive that is premixed or mixed in line with the PF, UF, or isocyanate adhesive component. If they wish to do so, these mills may still use a petroleum based wax as a sizing agent.

The total processing time and pressure varies with the parameters of a given mat. The following is an example of the noted press conditions for a commonly used mat. These conditions may vary for other mats. For example, thicker mats may require longer press times and greater pressures.

Wood chips or another agriculture based composite material and the adhesive are blended in a blender rotating at 20–24 RPM. The adhesive is applied via a coil spinning disc atomizer operating in the range of approximately 10,000 to 14,000 RPM. The panel is pressed in a hot press heated to about 380° F. and closed to apply a pressure of about 525 PSI until a desire sistance is reached. At approximately 1 minute, pressure is reduced to holding pressure to "cook" the adhesive. At about 4.5 minutes, the press pressure is reduced to 0 PSI to degas the panel. The press is opened at about 5 minutes after it was closed.

The blended product enables an optimal incorporation of the adhesive system onto the wood fiber substrate which is to be bonded and produces the best overall combination of wood panel properties needed in these applications. These wood panel properties include internal bonding, edge swell, pH, modulus of rupture ("MOR") and modulus of elasticity ("MOE").

Since the conjugated triglyceride adhesive works in conjunction with almost all co-adhesives with nearly equal effectiveness, it acts independently of the chemical bonding of each different co-adhesive. For example, phenolic resins react with excess formaldehyde in a condensation reaction which polymerizes the molecules. On the other hand, the adhesive properties of the isocyanates are based on the reactivity of the NCO groups taking the form of urethane bridges with the hydroxyl groups of the cellulose of the wood.

It is theorized that an important additional advantage imparted by the present overall adhesive system is that it soaks into and penetrates the surface of agriculture based composites, such as a wood surface, for example. Thus, when the overall adhesive system polymerizes, it provides a greater depth of adhesion with a more thorough coating of the wood surface than would otherwise be afforded by the use of the resin co-adhesive alone.

A resin, or similar co-adhesive, is needed for making an initial and rapid bonding of the wood fibers in order to allow the triglyceride polymerization to continue bonding over a longer period of time. More particularly, conjugated oils, such as tung oil, and various bodied and boiled linseed oils have been used for their strength through oxidative polymerization in protective paints and coatings for wood surfaces. However, this form of oxidative polymerization requires longer lengths of time which are longer than used for wood bonding applications. Therefore, use of a fast acting co-adhesive is required.

The inventive adhesive system has many advantages. The product has reduced VOC's since a triglyceride oil blend has no VOC's. The amount of VOC's produced in the adhesive system is reduced by the proportion of the blend that is a triglyceride in the formulation as compared with the proportion which is the phenolic or other resin co-adhesive. Also, the addition of triglyceride to the formulation reduces the total amount of adhesive that is required to make the end product due to an apparent co-adhesive effect. Thus, production can be increased, especially where a regulation limits the allowed amount of VOC's. Also, the use of triglycerides facilitates an increased production without increasing the risk of stack fires. Another benefit of the triglyceride adhesive system is the added water protection since modified linseed, tung and other oils tend to be water repellant. This reduction in water allows higher moisture content strands to be used. Finally, the triglyceride portion of the formulation has the advantage of being a renewable resource product.

GENERAL EXAMPLE

The invention provides bonding which meets or exceeds property standards for oriented strand board established by the "ANSI" standards for mat-formed particle board. Some properties which are important to the wood adhesive industry are: Density, Edge Swell, Modulus of Rupture ("MOR"), Modulus of Elasticity ("MOE").

A conjugated triglyceride oil is used as a co-adhesive in combination with a resin or adhesive for wood and wood chip applications including formed products, oriented strand board ("OSB"), particle board, plywood, and blended composites, especially those using chips. The adhesive system may also be used in the manufacture of floor coverings such as linoleum and the like. A portion of the bonded product may include used plastics, paper, cardboard, and other virgin or recycled materials.

The conjugated triglyceride should have a conjugation in the range of 5 to 100% of the portion that is conjugatable, more preferably 50–100%, and most preferably 70–80%, with a high melting saturated triglyceride optionally added in a range from 2 to 95% of the total of oil and triglycerides present. It is preferred to use 20 to 35% high melting saturated triglycerides. In the alternative, the conjugated triglyceride may be formulated with a high melting hydrocarbon in a range from 2 to 95%. The preferred range is from 25 to 30%. The high melting compound and the conjugated triglycerides may be added to the chips, in any order. The adhesive system may be further modified by chemically introducing additional functionality compatible with current adhesive systems. This addition may be in the range from 2 to 95%.

The conjugated triglyceride may additionally be blended from 1 to 100% with heat bodied or blown triglyceride oils of varying viscosities.

Archer's conjugated triglyceride (a product of Archer Daniels Midland Company) is preferably mixed with the coadhesive before applying to the wood chips for optimal mechanical and physical properties.

The co-adhesive may be taken from the following group:

Urea-Formaldehyde

Phenol-Formaldehyde

Melamine-Urea-Formaldehyde

Polyvinyl Acetate

Isocyanates

Resorcinol-Phenol-Formaldehyde

Protein

Tannin-Formaldehyde

Sulfite-Liquor

One experimental production run produced the following results:

A. Materials used:
1) Aspen Wood Strands
2) Hercules 2100 P wax emulsion, from Hercules Corp. Minneapolis, Minn.
3) Dyno 2461 Phenolic Resin, from Dyno Polymers, Virginia, Minn.
4) Isocyanate Resin: MDI (Monomeric Diisocyanate)

B. Press Conditions:
1) 400 degrees F platens metal pads
2) 500 PSI press
3) 30/60 seconds to close press to stops
4) 175–200 PSI 30 seconds (holding pressure)
5) 175 PSI 2½–3 minutes
6) 1.5 minutes of degas C. Procedure Used:
1) Blender
   Nest line blender rotating at 20 RPM
   70 lbs of wood chips
   Resin and wax added via a coil spinning disc atomizer at 12,000 RPM, ambient temperature.

2) Orienter

Chips oriented 50/50 face to core layer with a lab scale orienter. Target density for panel is 40 lbs. Panel size is 24×24½ inch thick.

3) Press 380 degrees F.

525 PSI starting pressure

175 PSI 1.5 minutes

100 PSI 4.5 minutes

0 PSI 5.0 minutes open press 5.5 minutes

4) Hot Stack 24 hours.

D. Results:

1) Density

2) Edge Swell

3) MOR

4) MOE

The invention adds a second co-adhesive to the fast setting co-adhesive, resin or glue-like material. In this example, the fast setting co-adhesive is the PF and MDI. The second material is slow setting and based upon triglycerides which have a slower set up and polymerizing time. This combination of fast and slow set up times enables the fast acting co-adhesive to react at a quicker press time with a higher moisture strand. The slower reacting resins or glue-like co-adhesives take longer press times but are generally less expensive and more readily available to the market. The slower set up resins are more greatly aided by this invention. The inventive combination of adhesives which both quickly bonds and more slowly penetrates, lead to a much stronger bond than was available heretofore.

The co-adhesive agent is a drying oil which produces additional bonding strength than most present bonding systems. When this adhesive system is used, the internal bond strength within a composite panel is very significantly increased while improving or retaining at least some other important aspects of conventional composite panel characteristics, such as moisture tolerance, edge swell, etc.

This improved adhesive system enables at least a partial replacement of currently used adhesives and a reduction in the total amount of adhesives and co-adhesives that are required. Also, this improved system may be used to produce products of an improved quality.

Those who are skilled in the art will readily perceive how to modify the invention. Therefore, the appended claims are to be construed to cover all equivalent structures which fall within the true scope and spirit of the invention.

The claimed invention is:

1. A co-adhesive bonding process for fibrous material, said process comprising:

blending an adhesive of a fast acting bonding material in combination with a conjugated triglyceride oil;

combining said blend with fibrous materials;

said conjugated triglyceride oil soaking into and penetrating said fibers; and subjecting said combined fibrous material and said blend to heat and pressure for polymerizing said fast acting bonding material and bonding said fibrous material into a composite panel.

2. The bonding process of claim 1 wherein said fast acting bonding material is taken from a group consisting of Urea-Formaldehyde, Phenol-Formaldehyde, Melamine-Urea-Formaldehyde, Polyvinyl Acetate, Isocyanate, Resorcinol-Phenol-Formaldehyde, Protein, Tannin-Formaldehyde, and Sulfite-Liquor.

3. The bonding process of either claim 1 or claim 2 wherein said conjugated triglyceride is taken from a group consisting of linseed oil, soybean oil, tung oil, and fish oil.

4. The bonding process of either claim 1 or claim 2 wherein said conjugated triglyceride is an oil containing a material taken from a group consisting of linolenic acid, linoleic acid and eicosapentanoic acid.

5. The bonding process of either claim 1 or claim 2 wherein said triglyceride is an oil having conjugatable double bonds.

6. The bonding process of claim 5 wherein said triglyceride is conjugated by a catalyst taken from the group consisting of ruthenium, $SO_2$, amine hydroiodides, primary alcohols, alkali, anthraquinone, and nickel/carbon.

7. The bonding process of claim 5 wherein said triglyceride is taken from a group consisting of a very hard hydrogenated fat, and a hydrocarbon wax having a very high melting point.

8. The bonding system of claim 1 or claim 2 where a mixture of wood chips and said adhesive blend are mixed in a blender and pressed at a pressure and heat determined by parameters of said composite panel.

9. A method of making a composite panel from fibrous material comprising the steps of:

reducing the fibrous material to fibrous strands;

preparing an adhesive blend of resin and conjugated triglyceride bonding agents;

mixing said fibrous strands and said adhesive blend of bonding agents;

orienting said fibrous strands into a mat comprising a stack of layers, the oriented fibrous strands in each of said layers lying at approximately right angles with respect to the orientation of the fibrous strands in the neighboring layers, and pressing the mat under a pressure in the range of about 525–100 PSI for a time period in the order of about 1–5.5 minutes, at a temperature of about 380° F.

10. The method of claim 9 and the added step of selecting said resin from a group consisting of Urea-Formaldehyde, Phenol-Formaldehyde, Melamine-Urea-Formaldehyde, Polyvinyl Acetate, Isocyanate, Resorcinol-Phenol-Formaldehyde, Protein, Tannin-Formaldehyde, and Sulfite-Liquor.

11. The method of claim 9 and the added step of selecting said conjugated triglyceride from a group consisting of linseed oil, soybean oil, tung oil, and fish oil.

12. The method of claim 9 and the added step of conjugating said triglyceride by use of a catalyst taken from a group consisting of ruthenium, $SO_2$, amine hydroiodides, primary alcohols, alkali, anthraquinone, and nickel/carbon.

13. The method of claim 9 wherein said triglyceride is taken from a group consisting of a very hard hydrogenated fat, and a hydrocarbon wax having a very high melting point.

14. The method of claim 9 and the added steps of applying said adhesive blend to wood chips through a coil spinning disc atomizer, said disc spinning at approximately 12000 RPM, blending the blend and the chips in a blender at approximately 24 RPM, and pressing the resulting wood chips at a pressure in the range of about 525–100 PSI for a period of time in the range of about 1–5 minutes, said pressing being at a temperature of about 380° F., said pressure being at about 525 PSI starting pressure, then at about 175 PSI for about 1.5 minutes, then at about 100 PSI for about 4.5 minutes, then at about 0 PSI for about 5.0 minutes, with an open press at about 5.5 minutes.

15. A method of making a panel from fibrous wood material comprising the steps of:

preparing an adhesive blend of resin and conjugated triglyceride bonding agents by reacting methylene interrupted organic compounds, in the absence of oxygen and in the presence of an acid, with a ruthenium compound chosen from the group consisting of organoruthenium complexes, soluble ruthenium metal, ruthenium salts, and ruthenium covalent compounds;

mixing said fibrous wood material and said adhesive blend of bonding agents;

orienting said fibrous wood material into a mat comprising a stack of the fibrous wood material; and pressing the mat under a pressure in the range of about 525–100 PSI for a time period in the order of about 1–5.5 minutes, at a temperature of about 380° F.

16. A method of making a wood panel comprising the steps of:

reducing wood to fibrous material;

modifying a methylene interrupt in a triglyceride prepared by reacting the triglyceride in the presence of an acid, with a ruthenium compound chosen from the group consisting of organoruthenium complexes, soluble ruthenium metal, ruthenium salts, and ruthenium covalent compounds, said triglyceride being taken from a group consisting of linseed, fish, soybean, tall, tung, corn, sunflower, castor, and oiticica, a very hard hydrogenated fat, and a hydrocarbon wax having a very high melting point;

preparing an adhesive blend of resin and said modified triglyceride;

mixing said fibrous wood material and said adhesive blend;

orienting said fibrous wood material into a mat comprising a stack of the fibrous wood material; and pressing the mat under a heat and pressure.

17. The method of claim 16 in which the triglyceride is a common vegetable oil.

18. The method of claim 17 in which the common vegetable oil is linseed oil.

19. The method of claim 17 in which the common vegetable oil is soybean oil.

20. The method of claim 16 in which a conventional antioxidant is included in the modifying step.

* * * * *